United States Patent [19]

Tracht

[11] Patent Number: 4,859,919
[45] Date of Patent: Aug. 22, 1989

[54] WINDOW WIPER CONTROL FOR VEHICLE

[75] Inventor: Steven L. Tracht, Centerville, Ohio

[73] Assignee: General Motors Corporation, Detroit, Mich.

[21] Appl. No.: 237,464

[22] Filed: Aug. 29, 1988

[51] Int. Cl.$^4$ ............................................. B60S 1/08
[52] U.S. Cl. ............................. 318/444; 318/DIG. 2
[58] Field of Search ................. 318/443, 444, DIG. 2; 15/250 C, 250.13, 250.16, 250.17

[56] References Cited

U.S. PATENT DOCUMENTS

| | | |
|---|---|---|
| 3,262,042 | 7/1966 | Amos . |
| 3,333,174 | 7/1967 | Moller et al. . |
| 3,364,410 | 1/1968 | Foreman . |
| 3,492,558 | 1/1970 | Patterson, Jr. et al. . |
| 3,581,178 | 5/1971 | Kearns .................... 318/443 |
| 3,611,094 | 10/1971 | Bischoff ................ 318/443 X |
| 3,614,573 | 10/1971 | Rieman et al. . |
| 3,624,477 | 11/1971 | Rieman et al. ............ 318/443 |
| 3,644,744 | 2/1972 | Holt . |
| 3,728,603 | 4/1973 | Kearns ............... 318/DIG. 2 X |
| 3,869,654 | 3/1975 | Bischoff et al. . |
| 4,375,610 | 3/1983 | Nagaoka et al. ..... 318/DIG. 2 X |
| 4,419,611 | 12/1983 | Kawasaki et al. . |
| 4,492,904 | 1/1985 | Graham . |

FOREIGN PATENT DOCUMENTS 2465618 4/1981 France ........................... 318/443

Primary Examiner—Bentsu Ro
Attorney, Agent, or Firm—Robert M. Sigler

[57] ABSTRACT

A window wiper control for a motor vehicle in which a relay has an armature connected in series with a motor, an electric power source and a pulse switch through a normally closed contact and further connected in series with the motor, a park switch and source of electric power through a normally open contact. The park switch is responsive to the wiper mechanism to open when the wiper is in a park position and close throughout the rest of the wipe pattern. An electrically controlled switch is connected in series with the relay activating coil and electric power source with a base connected to a capacitor connected to be charged quickly through the park switch and discharged slowly through a resistance. Closure of the pulse switch initiates an immediate cycle of the wipe pattern and a new such cycle after each pause through the normally closed contact of the relay with the remainder of each such cycle being activated through the normally open contact of the relay, the relay armature being held in contact with the normally open contact as the capacitor discharges with the park switch open to create the pauses between successive cycles of the wipe pattern.

4 Claims, 1 Drawing Sheet

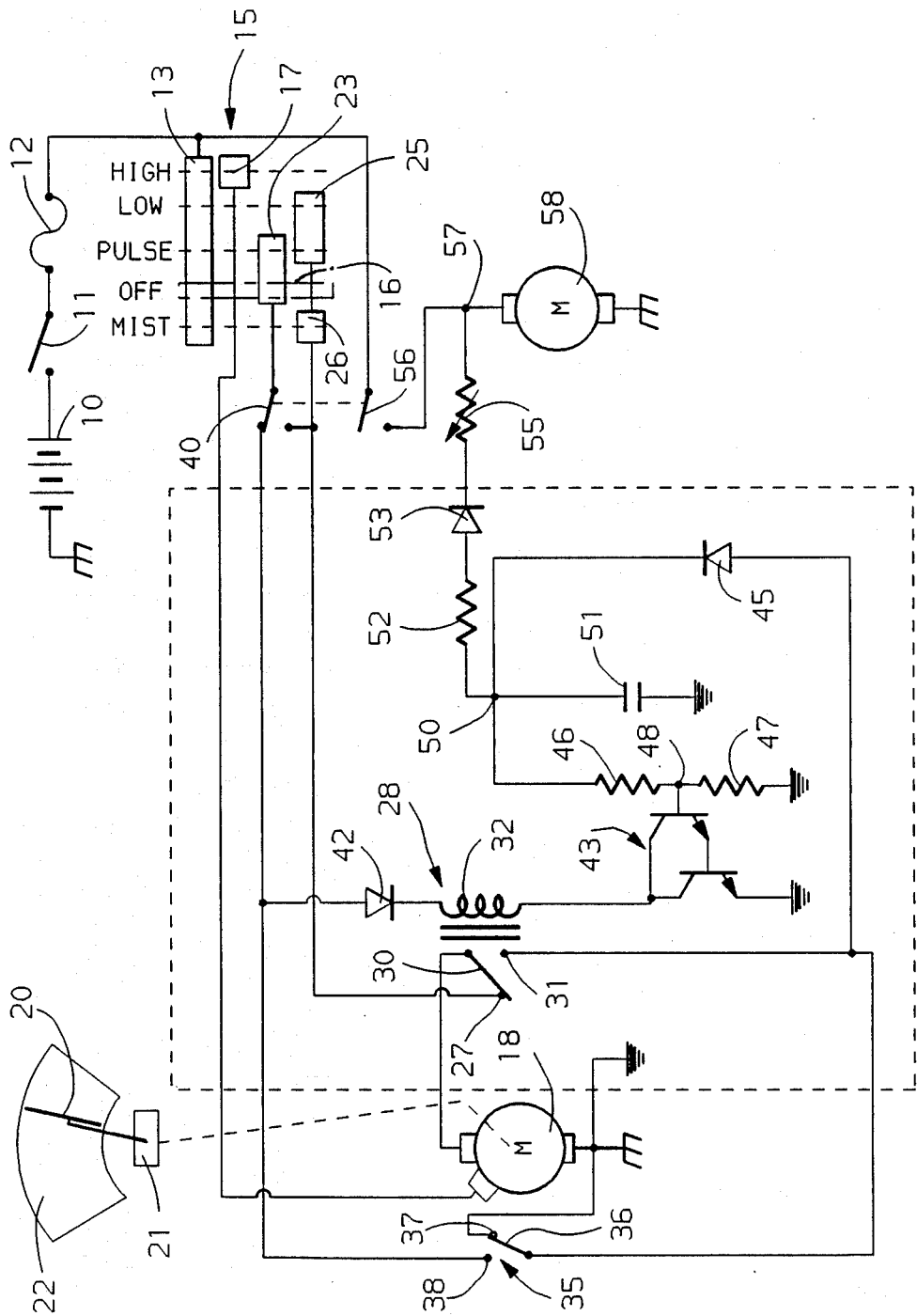

WINDOW WIPER CONTROL FOR VEHICLE

BACKGROUND OF THE INVENTION

This invention relates to wiper controls for motor vehicle window wiper systems, and particularly to such controls of the pulse type in which the wiper is paused in a park position between successive cycles of the wipe pattern. It is desirable in such systems to provide for an instant or immediate wipe cycle, without a preceding pause, when pulse wipe is initiated. The wiper control systems of the prior art generally enter a pulse mode of operation when pulse operation is selected; and operation in this pulse mode requires that pause before the first cycle must generally be overridden by additional circuitry to provide the desired instant wipe. The additional circuitry adds cost and complexity to the control.

SUMMARY OF THE INVENTION

The window wiper control of this invention essentially provides pulse wiper operation with instant wipe and other advantages by rearranging the wiper control functions so that each cycle of the wiper pattern is initiated in a run mode, with the system changing to the pulse mode for the remainder of each cycle and the pause at the end of the cycle. The control does not require any significant additional circuitry in order to provide the desired instant wipe in pulse operation, since each cycle of the wiper pattern, even in pulse operation, is initiated in the run mode.

In greater detail, this invention is a window wiper control for a motor vehicle having a window and a wiper mechanism including an electric motor effective, when activated, to drive a wiper across the window in repeating cycles of a wipe pattern with a pause in a park position between successive cycles. The window wiper control comprises a source of electric power, a pulse switch, a park switch responsive to the wiper mechanism to open when the wiper is in its park position and close throughout the rest of the wipe pattern. The window wiper control further comprises a relay having an armature connected in series with the motor, electric power source and park switch through a normally closed contact and further connected through in series with motor, park switch and source of electric power through a normally open contact. The relay further has an activating coil effective, when activated, to move the armature out of contact with the normally closed contact and into contact with the normally open contact.

The window wiper control further comprises an electrically controlled switch connected in series with the relay coil and the electric power source and having a control terminal and a capacitor connected in series with the park switch and electric power source so as to be charged to a high voltage when the park switch is closed, the capacitor being further connected to the control terminal of the electrically controlled switch so as to close the switch with the high voltage. The window wiper control finally comprises a resistance comprising a discharge current path for the capacitor effective to slowly discharge the capacitor to a low voltage when the park switch is open, the low voltage being applied to the control terminal and effective thereby to open the electrically controlled switch means.

With this apparatus, closure of the pulse switch initiates an immediate cycle of the wipe pattern and a new such cycle after each pause in a run mode through the normally closed contact of the relay with the remainder of each such cycle being activated in a pulse mode through the normally open contact of the relay, the relay armature being held in contact with the normally open contact as the capacitor discharges with the park switch open to create the pauses between successive cycles of the wipe pattern. The desired instant wipe operation is thus obtained without additional circuitry.

Further details and advantages of this invention will be apparent from the accompanying drawings and following description of a preferred embodiment.

SUMMARY OF THE DRAWINGS

The single drawing is a circuit diagram of a preferred embodiment of the invention.

DESCRIPTION OF THE PREFERRED EMBODIMENT

With reference to the single drawing, an electric power source 10, shown as a battery, is the standard vehicle electric power source including battery, alternator, voltage regulator, etc., which supplies current at a supply voltage with respect to ground. Electric power source 10 is connected through a standard vehicle ignition switch 11 and fuse 12 to a stationary contact 13 of a wiper control switch 15. A movable contact 16 makes electrical contact with stationary contact 13 in five different positions labeled, from the left in the drawing: MIST, OFF, PULSE, LOW, and HIGH. Movable contact 16 is shown in its OFF position and is movable to the left or right in the drawing to the other positions. The wiper actions initiated in each of these positions are, in order from left to right, a single cycle of the wiper pattern, wipers off, pulse operation, continuous low speed operation, and continuous high speed operation.

Another stationary contact 17 is aligned to be contacted by movable contact 16 only in its HIGH position. Stationary contact 17 is thereby connected to the high speed brush of a three brush, permanent magnet, DC motor 18, which has a grounded common brush. Thus, movement of movable contact 16 into the HIGH position connects stationary contacts 13 and 17 to power motor 18 for high speed operation. The output shaft of motor 18 drives a wiper 20 through a wiper drive mechanism 21 for repeating cycles of a wipe pattern on a vehicle window 22. The wipe pattern covers a substantial portion of the viewing area of window 22 and includes one park position, normally at one end of the wipe pattern, in which wiper 20 may be paused in pulse operation or parked when not in use.

A stationary contact 23 of wiper control switch 15 is aligned to be contacted by movable contact 16 only in its OFF and PULSE positions. A stationary contact 25 of wiper control switch 15 is aligned to be contacted by movable contact 16 only in its PULSE and LOW positions. Finally, a stationary contact 26 of wiper control switch 15 is aligned to be contacted by movable contact 16 only in its MIST position. For purposes of reading the claims of this patent, movable contact 16 and stationary contact 25 comprise a pulse switch which is closed with movable contact 16 in its PULSE and LOW positions and open with movable contact 16 in its OFF position. In addition movable contact 16 and stationary contact 23 comprise a continuous switch which is closed with movable contact 16 in its OFF and PULSE positions and open with movable contact 16 in its LOW position.

Stationary contacts 25 and 26 are connected to the normally closed contact 27 of a relay 28 having an armature 30, a normally open contact 31 and an actuating coil 32. Armature 30 of relay 28 is connected to the low speed brush of motor 18. Normally open contact 31 of relay 28 is connected to the armature 36 of a park switch 35, which is activated by motor 18 or wiper drive mechanism 21 so as to be wiper position responsive and has a park contact 37 which is closed by armature 36 when the wiper is in its park position open when the wiper is in any other position and a run contact 38 which is open when the wiper in its park position and closed by armature 36 when the 15 wiper is in any other position. Armature 36 and run contact 38 thus comprise a first park switch which is open only with the wiper in its park position; and armature 36 and park contact 37 comprise a second park switch which is closed only with the wiper in its park position. Park contact 37 is grounded; and run contact 38 is connected to stationary contact 23 of wiper control switch 15, optionally, as shown in the drawing, through a first washer switch 40 in its nonactivated position. First washer switch 40, in its activated position, connects stationary contact 23 to stationary contact 26 of wiper control switch 15 and normally closed contact 27 of relay 28.

Stationary contacts 25 and 26 of wiper control switch 15 are connected through a diode 42 to one end of activating coil 32, the other end of which is connected to the collector of an NPN Darlington transistor 43 having a grounded emitter. Normally open contact 31 of relay 28 is connected to ground through a diode 45 and resistors 46 (10K) and 47 (10K) in series, with junction 48 of resistors 46 and 47 connected to the base of transistor 43. Junction 50 of the cathode of diode 45 and resistor 46 is connected to ground through a capacitor 51 (150μF.). Junction 50 is further connected through a resistor 52 (1.0K, 1%), diode 53, variable resistor 55 (0-100K) and, optionally, a second washer switch 56 to stationary contact 13 of wiper control switch 15 and fuse 12. Junction 57 of variable resistor 55 and second washer switch 56 is connected through the armature of a washer pump motor 58 to ground.

The washer switches 40 and 56 are normally in the nonactivated positions shown, with first washer switch 40 connecting stationary contact 23 to run contact 38 of park switch 37 and second wash switch 56 open. When window washer operation is desired, both switches are activated together to their activated positions, with first washer switch 40 connecting stationary contact 23 to stationary contacts 25 and 26 and normally closed contact 27 of relay 28 and second washer switch 56 closed to connect washer motor 58 in series with ignition switch 11 and electric power source 10. For convenience, first and second washer switches 40 and 56 may be ganged together in a switch mechanism biased to the first position described above.

When ignition switch 11 is initially closed with movable contact 16 of wiper control switch 15 in its OFF position, electric power source 10 is connected through stationary contact 23 and diode 42 in series with activating coil 32 and transistor 43; however, there is no conduction in the absence of base drive for transistor 43. Motor 18 therefore does not operate.

Whenever movable contact 16 is moved to its OFF position from any other position with wiper 20 out of its park position and park switch 35 thus in its run position with armature 36 connected to run contact 38, electric power source 10, in addition to being connected in series with coil 32 and transistor 43, is further connected, through park switch 35 and diode 45, to quickly charge capacitor 51 to a high voltage one diode drop below the supply voltage and provide base drive current to transistor 43. Transistor 43 conducts and activates armature 30 of relay 28 into contact with normally open contact 31. Electric power source 10 is thus connected through park switch 35 and normally open contact 31 of relay 28 to finish the current cycle of the wipe pattern and return to the park position, whereupon park switch 35 closes. With return of park switch 35 to its park position with movable contact 16 in its OFF position, connection of relay armature 30 is switched from electric power source 10 to ground; and motor 18 is deactivated with wiper 20 in the park position. Although electric power source is disconnected from diode 45, it is still connected in series with coil 32 and transistor 43; and capacitor 51 temporarily provides base drive current for transistor 43 as it discharges so as to hold relay 28 activated and thus provide electrodynamic braking for motor 18 through park switch 35.

Movable contact 16 of wiper control switch 15 is biased from the MIST position toward the OFF position. Activation of movable contact 16 into its MIST position connects stationary contacts 13 and 26 to connect motor 18 across electric power source 10 through normally closed contact 27 and armature 30 of relay 28. This activates motor 18 to begin operation; and it will be activated through stationary contact 26 and normally closed contact 27 of relay 28, without relay activation, to drive wiper 20 continuously through successive wipe cycles as long as movable contact 16 is held in the MIST position. However, shortly after operation of motor 18 is initiated, wiper 20 will move out of its park position; and movable contact 16 may be released to return to its OFF position, whereupon the control will complete the initiated cycle of the wipe pattern as described in the preceding paragraph and return wiper 20 to its park position.

Continuous operation at low speed is similarly provided when movable contact 16 of wiper control switch 15 is moved to its LOW position, with electric power source 10 connected to normally closed contact 27 of relay 28 through stationary contact 25, except that movable contact 16 is not biased away from this position and therefore remains therein, with continuous activation of motor 13 through stationary contact 25 and normally closed contact 27 and armature 30 of relay 28, until it is manually returned to it OFF position. With movable contact 16 in its OFF position, the last initiated cycle of the wipe pattern is completed as described above.

For pulse operation, movable contact 16 is moved to the PULSE position. In this position, both stationary contacts 23 and 25 are connected to electric power supply 10. Initiation of a wipe cycle is obtained instantly through normally closed contact 27 of the unactivated relay 28 as in MIST or LOW operation. Switching of park switch 35 to its run position occurs as wiper 20 moves out of its park position; and this causes activation of relay 28 with continued motor activation through park switch 35 and normally open contact 31 of relay 28 for the rest of the wipe pattern, as in MIST or LOW operation with return of wiper 20 to its park position. When wiper 20 reaches the park position and park switch 35 switches armature 36 to park contact 37, the connection of normally open contact 31 of relay 28 switches from supply voltage to ground; and motor 18 is dynamically braked to a stop with wiper 20 in the park position. Relay 28 is maintained in its activated state through stationary contact 23 while capacitor 51 slowly discharges through resistor 46 and the base/emitter junction of transistor 43 and, in parallel, resistors 52 and 55 in series with the armature resistance of washer motor 58. Variable resistor 55 permits operator control of the rate of discharge for pause duration control.

When the voltage on capacitor 51 falls below that required for the conduction of transistor 43, relay 28 is deactivated, whereupon armature 30 switches to normally closed contact 27. However, this contact still receives supply voltage from electric power source 10 through stationary contact 25 and movable contact 16 in its PULSE position. Therefore, motor 18 is energized for the initiation of another cycle of the wipe pattern as already described. The cycles are repeated indefinitely with cycles of the wiper pattern separated by pauses until movable contact 16 is moved out of the PULSE position.

Washer operation is obtained by simultaneous activation of washer switches 40 and 56. Second washer switch 56 is activated to connect washer motor 58 from in series with electric power source 10 through ignition switch 11 and thus activate it to drive the washer pump for deposition of cleaning fluid on window 22. If motor 18 is already being activated with wiper control switch 15 in its HIGH, LOW or MIST positions, activation of switch 40 has no practical effect; and motor 18 continues at the chosen speed to clear the windshield of the washer fluid and dirt, both during and after activation of the washer switches. Switch 40, when switched, connects stationary contact 23 to normally closed contact 27 of relay 28, which activates motor 18 for the same purpose with movable contact 16 of wiper control switch 15 in its OFF or PULSE positions connecting stationary contact 23 to electric power source 10. However, switching of switch 40 also disconnects stationary contact 23 from run contact 38 of park switch 35 and from relay coil 32 and transistor 43. Therefore, with movable contact 16 of wiper control switch 15 in its OFF or PULSE positions, washer activation prevents activation of relay 28 and produces continuous activation of motor 18 in low speed through normally closed contact 28 of relay 28. When the wash switches are released, they are returned to their deactivated positions, whereupon washer motor 58 is deactivated and wiper operation returns to normal. In the HIGH, LOW or MIST positions of movable contact 16, motor 18 continues at the chosen speed. In the PULSE position of movable contact 16, the system returns to pulse operation. With movable contact 16 in its OFF position, the current wipe cycle is completed with return of wiper 20 to its park position. If desired, additional circuitry could be provided for a programmed wipe after wash with movable contact 16 in its OFF position. Alternatively, wiper control switch 15 could be designed to mechanically move movable contact 16 out of its OFF position to its LOW position when the washer switches are activated in order to ensure additional wipes after the washer pump stops. Another alternative would be for the washer switches 40 and 56 to be separately activated, with switch 40 held activated, mechanically or electrically, after switch 56 is deactivated to provide the extra wipe cycles.

The embodiments of the invention in which an exclusive property or privilege is claimed are defined s follows:

1. A window wiper control for a motor vehicle having a window and a wiper mechanism including an electric motor effective, when activated, to drive a wiper across the window in repeating cycles of a wiper pattern with a pause in a park position between successive cycles, the window wiper control comprising, in combination:
    a source of electric power;
    a pulse switch;
    a park switch responsive to the wiper mechanism to close a first circuit path when the wiper is in its park position and alternatively close a second circuit path throughout the rest of the wipe pattern;
    a relay having an armature connected in series with the motor, source of electric power and pulse switch through a normally closed contact and further connected in series with the motor, the first circuit path of the park switch and source of electric power through a normally open contact, the relay further having an activating coil effective, when activated, to move the armature out of contact with the normally closed contact into contact with the normally open contact, the relay armature being further connected in series with the motor and the second circuit path of the park switch for dynamic braking of the motor when the relay armature is in contact with the normally open contact and the second circuit path of the park switch is closed;
    an electrically controlled switch connected in series with the relay coil and electric power source and having a control terminal;
    a capacitor connected in series with the park switch and electric power source so as to be charged to a high voltage when the park switch is closed, the capacitor being further connected to the control terminal of the electrically controlled switch so as to close the switch with the high voltage;
    a resistance comprising a discharge current path for the capacitor effective to slowly discharge the capacitor to a low voltage when the park switch is open, the low voltage being applied to the control terminal and effective thereby to open the electrically controlled switch, whereby closure of the pulse switch initiates an immediate cycle of the wipe pattern and a new such cycle after each pause through the normally closed contact of the relay with the remainder of each such cycle being activated through the normally open contact of the relay, the relay armature being held in contact with the normally open contact as the capacitor discharges with the park switch open to create the paused between successive cycles of the wipe pattern.

2. The window wiper control of claim 1 further comprising a continuous switch between the park switch and electric power source, the continuous switch when closed allowing pulse operation with closure of the pulse switch and return of the wiper to the park position with the pulse switch open but being openable with the pulse switch closed to prevent charging of the capacitor and activation of the electrically controlled switch and relay, whereby the motor is continuously activated through the pulse switch and relay armature.

3. The window wiper control of claim 1 in which the park switch is a first park switch, the window wiper control further comprising a second park switch responsive to the wiper mechanism to close when the wiper is in its park position and open throughout the rest of the wiper pattern, the second park switch connecting in series, when closed, the electric motor and relay armature through the normally open contact of the relay, whereby the motor is electrodynamically braked when the wiper is paused in the park position during pulse operation and also when it is returned to its park position at the end of operation.

4. The window wiper control of claim 2 in which the vehicle further comprises a washer pump motor, the wiper control further comprising:
- a first washer switch effective, when activated, to connect the washer pump motor across the electric power source for activation thereby; and
- a second washer switch effective, when activated, to disconnect the continuous switch from the park switch and connect the continuous switch in parallel with the pulse switch to provide continuous activation of the motor and deactivation of the relay.

* * * * *